(12) United States Patent
Ford et al.

(10) Patent No.: US 11,182,057 B2
(45) Date of Patent: Nov. 23, 2021

(54) USER SIMULATION FOR MODEL INITIALIZATION

(71) Applicant: APPLE INC., Cupertino, CA (US)

(72) Inventors: Joshua R. Ford, Santa Clara, CA (US); Bianca Marcial Ocasio, Mercer Island, WA (US); Wajeeh Syed, Sunnyvale, CA (US); Michael C. Landers, Santa Clara, CA (US); Sunny R. Sainani, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 16/054,986

(22) Filed: Aug. 3, 2018

(65) Prior Publication Data

US 2020/0042147 A1  Feb. 6, 2020

(51) Int. Cl.
*G06F 3/0484* (2013.01)
*G06F 3/0481* (2013.01)
*G06F 16/16* (2019.01)
*G06N 20/00* (2019.01)
*G04G 9/00* (2006.01)

(52) U.S. Cl.
CPC .......... *G06F 3/0484* (2013.01); *G06F 3/0481* (2013.01); *G06F 16/16* (2019.01); *G06N 20/00* (2019.01); *G04G 9/007* (2013.01)

(58) Field of Classification Search
CPC ...... G06F 3/0484; G06F 16/16; G06F 3/0481; G06F 3/0483; G06N 20/00; G06N 3/0454; G06N 7/005; G04G 9/007; G04G 21/06; G04G 21/04; G04G 21/02; G04G 21/08
See application file for complete search history.

(56) References Cited

U.S. PATENT DOCUMENTS 8,775,332 B1 * 7/2014 Morris ................... G06N 20/00
706/11
10,120,746 B1 * 11/2018 Sharifi Mehr ........ G06F 11/079
(Continued)

OTHER PUBLICATIONS

Rahul Jain, Joy Bose, Tasleem Arif, WMG Group,Samsung R&D Institute, Bangalore, India ,Title:Context based adaptation of application icons in mobile computing devices, 2013 (Year: 2013).*

*Primary Examiner* — Cesar B Paula
*Assistant Examiner* — Zelalem "Zee" Shalu
(74) *Attorney, Agent, or Firm* — Morgan, Lewis & Bockius LLP

(57) ABSTRACT

The subject technology provides generating configuration files that represent user interaction scenarios on a device, the configuration files including a set of user interface (UI) elements to display and a set of interactions corresponding to user activity to perform on at least one UI element of the set of UI elements. The subject technology processes the configuration files using a relevance engine to determine a relevance score of each UI element of the set of UI elements, wherein the relevance score is based at least in part on weights assigned to features based on the user activity and respective variance values of the features, and the features include information related to a location or time. The subject technology generates a user simulation based machine learning model based at least on each relevance score of each UI element. The subject technology stores the user simulation based machine learning model on the device.

20 Claims, 8 Drawing Sheets

(56) References Cited

U.S. PATENT DOCUMENTS

| | | | | |
|---|---|---|---|---|
| 10,497,012 | B1* | 12/2019 | Majumder | G06Q 30/0641 |
| 2006/0190822 | A1* | 8/2006 | Basson | G06Q 10/10 |
| | | | | 715/700 |
| 2016/0034133 | A1* | 2/2016 | Wilson | G06F 3/0488 |
| | | | | 715/772 |
| 2016/0203415 | A1* | 7/2016 | Chaiyochlarb | G06F 3/04817 |
| | | | | 706/11 |
| 2017/0277374 | A1* | 9/2017 | Ozcan | G06F 3/0484 |
| 2018/0197428 | A1* | 7/2018 | Baphna | G09B 7/00 |
| 2019/0205839 | A1* | 7/2019 | Dotan-Cohen | A61B 5/1118 |
| 2019/0208130 | A1* | 7/2019 | Hara | H04N 5/04 |

\* cited by examiner

USER SIMULATION FOR MODEL INITIALIZATION

TECHNICAL FIELD

The present description relates generally to simulating user behavior with an electronic device, including simulating user behavior for model initialization.

BACKGROUND

Mobile electronic devices (e.g., watch or smartphone) are popular and are often carried by users while performing daily, and/or recurring, tasks. For example, a user of a mobile electronic device may interact with the device over the course of a day by using mobile applications that are installed locally on the device. The mobile electronic device, however, may have a small screen that limits the amount of information that can be provided to the user at any given time. Thus, if the information provided to a user at any given time is not relevant to the user, the user may need to further interact with the mobile electronic device to find relevant information and/or applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
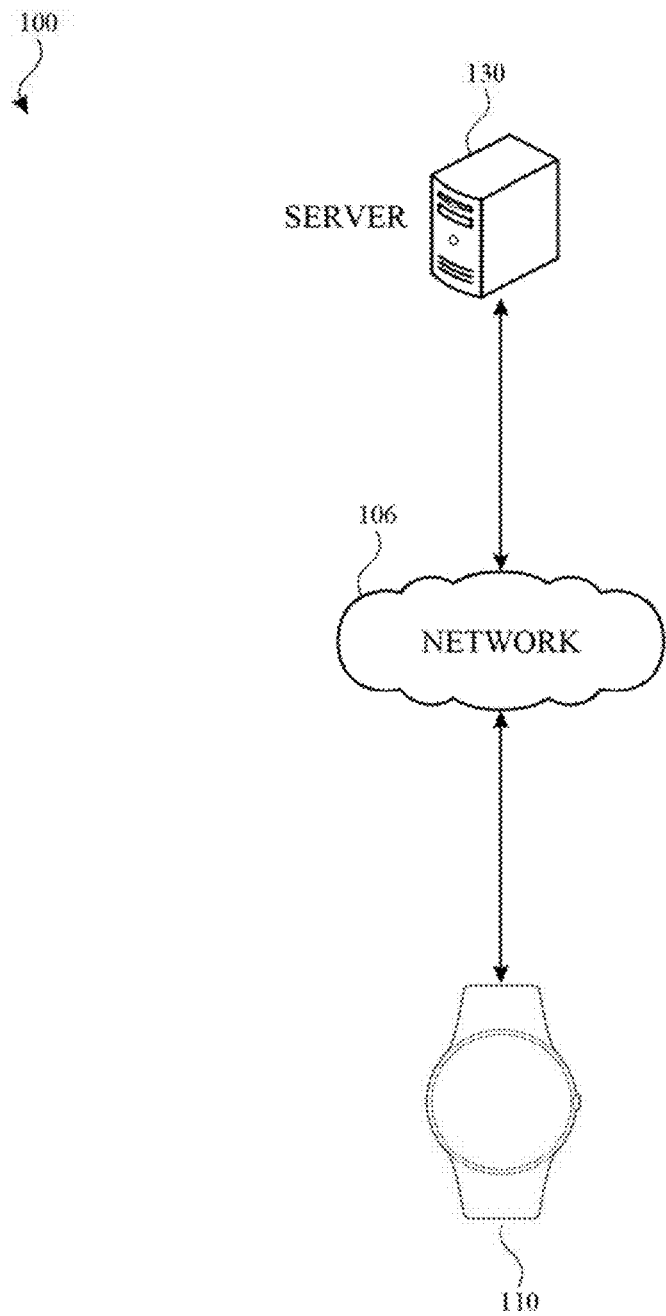
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A machine learning model may be utilized to determine relevant information for presenting to a user. With the introduction of wearable electronic devices (e.g., a smartwatch) that may have limited processing power and/or small display screens, ensuring that the user experience (upon activation) is tailored to the user may be difficult to provide (since the user has not yet interacted with the device and therefore user specific attributes are not known). Such wearable electronic devices may execute various applications on the devices that provide information, in the form of visual graphical elements, that are presented to the user. Examples of such applications may include, for example, calendar, weather, sports, among many others (as discussed further herein).

A wearable electronic device may provide, for display, a user interface (UI). For example, the UI may include an arrangement of UI elements depicting cards (e.g., wearable device face tiles) in which each of the cards may contain information (e.g., content including text, images, graphical elements, etc.) that is visually displayed to the user. As used herein, a card may refer to a wearable device face tile or vice versa. Due to the limited size of the display screen on the wearable electronic device, it may be more vital to provide relevant information for display such that the user is able to interact with the wearable electronic device in a more efficient and/or productive manner. For example, a visual arrangement of cards may include several UI elements. In some implementations, information associated with a single card may only be visible, while information associated with the other cards may not be visible at the display. Thus, if only a single card is visible at a time there may be an increased importance for ensuring that the first card presented to the user includes information that is relevant to the user.

The subject technology simulates user behavior, using configuration files representing particular user scenarios, for generating a user simulation based machine learning model. The user simulation based machine learning model, based on a set of configuration files, may then be utilized for pre-training a machine learning (ML) model which provides relevant information. The ML model may then be stored on a particular electronic device. In an example, the ML model, when executing on the particular electronic device, adjusts relevance scores based on the behavior of a user of the electronic device over time. By providing the user simulation based machine learning model for training, or pre-training, the ML model, the electronic device works in an expected manner to the user after being initially activated, such as by presenting relevant information to the user on the first card that is displayed.

More specifically, implementations described herein provide a system that enables recommendations (e.g., suggested content) to be provided after an electronic device is activated, using a ML model generated based on configuration files. In an example, recommendations may be provided in the form of user interface (UI) elements, displayed on a particular electronic device, that indicate suggested interactions for the user to perform and/or that provide relevant content to the user.

FIG. 1 illustrates an example network environment 100 for providing relevant data to an electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 130. The network 106 may communicatively (directly or indirectly) couple, for example, any two or more of the electronic device 110, and/or the server 130. In one or more implementations, the network 106 may be an interconnected network of devices that may include, or may be communicatively coupled to, the Internet. For explanatory purposes, the network environment 100 is illustrated in FIG. 1 as including an electronic device 110, and a server 130; however, the network environment 100 may include any number of electronic devices and any number of servers.

The server 130 may be part of a network of computers or a group of servers, such as in a cloud computing or data center implementation. The server 130 may store data, such as photos, music, text, web pages and/or content provided therein, etc., that may be accessible on the electronic device 110. The server 130 may be, and/or may include all or part of the electronic device discussed below with respect to FIG. 8.

The electronic device 110 may be, for example, a wearable device configured to be worn on a user's arm that includes, for example, one or more wireless interfaces, such as WLAN radios, cellular radios, Bluetooth radios, Zigbee radios, near field communication (NFC) radios, and/or other wireless radios. The electronic device 110 may be, and/or may include all or part of the electronic device discussed below with respect to FIG. 7.

Although the electronic device 110 is illustrated as being capable of communicating with another device or server using the network 106, in one or more implementations described herein, the electronic device 110 performs operations locally on the device itself to provide relevant information to a user.

Figure 2:
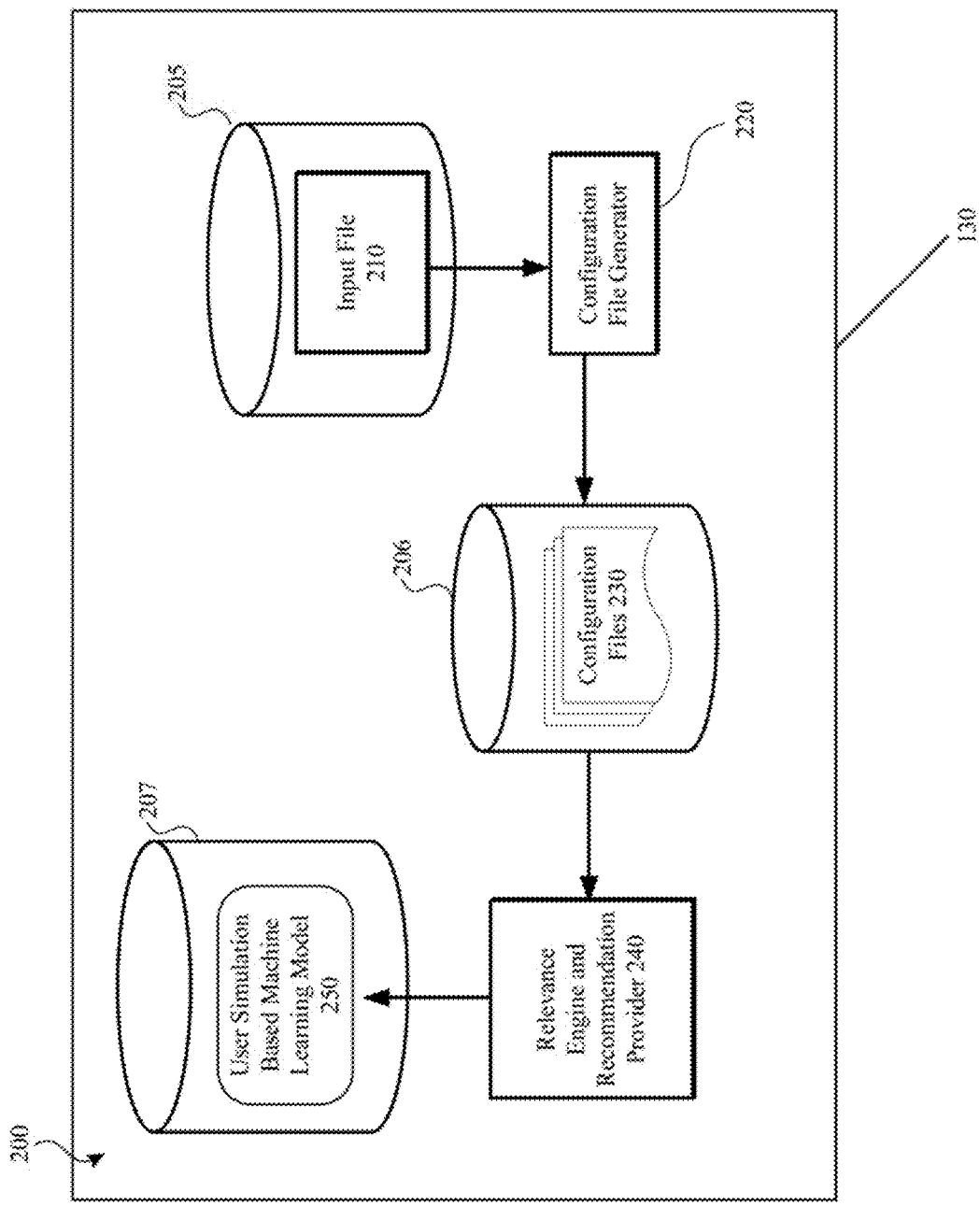
FIG. 2 illustrates an example diagram of an architecture of a system for providing a user simulation for model initialization in accordance with one or more implementations.

FIG. 2 illustrates an example diagram of an architecture 200 of a system for providing a user simulation for model initialization in accordance with one or more implementations. For explanatory purposes, the architecture 200 is described as being implemented by the server 130 of FIG. 1, such as by a processor and/or memory of the server 130; however, the architecture 200 may be implemented by the electronic device 110, or any other electronic device(s). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the architecture 200 may be implemented on the server 130 for providing a user simulation for model initialization. The server 130 includes a relevance engine and recommendation provider 240, a database 205 including input file 210, a database 206 including configuration files 230, a database 207 including a user simulation based machine learning model 250, and a configuration file generator 220. Although separate databases are shown in the example of FIG. 2 for purposes of explanation, it is appreciated that in some implementations fewer than three databases can be utilized such that the input file 210, the configuration files 230 and/or the user simulation based machine learning model 250 are stored in the same database.

As illustrated, input file 210 is provided, such as by user input. In an implementation, the input file 210 includes information indicating which cards to show on the display of the electronic device 110 in a given state. In an implementation, each state may correspond to a particular scenario of a user corresponding to a particular time and/or location (e.g., morning, commute, work, school, gym, and home that relate to different routines or periods of time during the day or night). Further, the input file may include information indicating which interaction(s) are available for each card. An example input file is discussed in more detail in FIG. 3. As a particular card provided for display can correspond to a particular application, the types of interactions available for the card may be dependent on the particular application. For example, interactions may be gesture-based (e.g., tap, press, swipe, drag, etc.) that can invoke different functionality provided by the application.

In one or more implementations, from the input file, the configuration file generator 220 generates a set of configuration files in which each configuration file can represent a particular scenario for a user. Such scenarios may include, without limitation, scenarios for morning, commute, work, school, gym, and home that relate to different routines or periods of time during the day or night. In an example, the configuration file may include 1) a list of the data or content to show at a specific time or date for each card, and 2) a list of interactions simulated to perform for each card. Further, the configuration file may include information related to a current location of the user for that particular scenario represented by the configuration file. Thus, each configuration may represent user behavior that may be simulated as user interactions (e.g., user activity) with one or more cards provided by one or more applications. An example of a configuration file is further discussed in FIG. 4.

Moreover, interactions in a particular configuration file may include user activity indicating types of simulated interactions (e.g., usage information) with a particular card provided by an electronic device application including, for example, a dwell time, tap through and/or scrolling performed by the user. As referred to herein, dwell time corresponds to how long a user hovers over a particular UI element provided by an electronic device application. Scrolling activity may correspond to how far the user scrolls down a list of UI elements provided by one or more electronic device applications. Further, tap through or not activity corresponds to whether a user taps on a UI element or not which indicates whether the user wanted to get more information related to content provided by the UI element.

A particular UI element (e.g., card or watch face tile) as discussed herein may be provided by a particular application that is local to a particular electronic device (e.g., the electronic device 110) that utilizes a machine learning model that is pre-trained by the user simulation based machine learning model 250. Some non-limiting examples of applications local to the electronic device may include wearable device applications, widgets, or programs, etc., such as the following: calendar, reminders, alarms, timers, stopwatch, weather, stocks, sports, TV shows, maps, turn-by-turn navigation, sunrise, sunset, activity, breathe, fitness, heartbeat information, active workout, commute, news, Internet of things (IoT), home automation, digital wallet, and/or other wearable device applications providing donated information, etc.

In one or more implementations, the configuration file generator 220 stores the generated configuration files 230 in the database 206. As illustrated, the relevance engine and recommendation provider 240 may receive the configuration files 230 for processing to generate a user simulation based machine learning model (e.g., the user simulation based machine learning model 250), which may be utilized to training, or pre-train, a machine learning (ML) model. As discussed above, the configuration files 230 include user activity (e.g., interactions for cards) that is simulated for one or more cards. In an implementation, the relevance engine and recommendation provider 240 simulates the interactions of one or more cards based on the information from the configuration files 230. In addition, the relevance engine and recommendation provider 240 determines relevance scores based on the simulated user activity of the configuration files 230 which may be used to train, or pre-train, a machine learning model for providing recommendations on electronic devices, such as the electronic device 110. The server 130 may then store the machine learning model on one or more electronic devices, such as the electronic device 110. For example, the machine learning model may be stored on the electronic device 110 at the time of manufacturing, and/or at some time prior to providing the electronic device 110 to one or more users.

Figure 6:
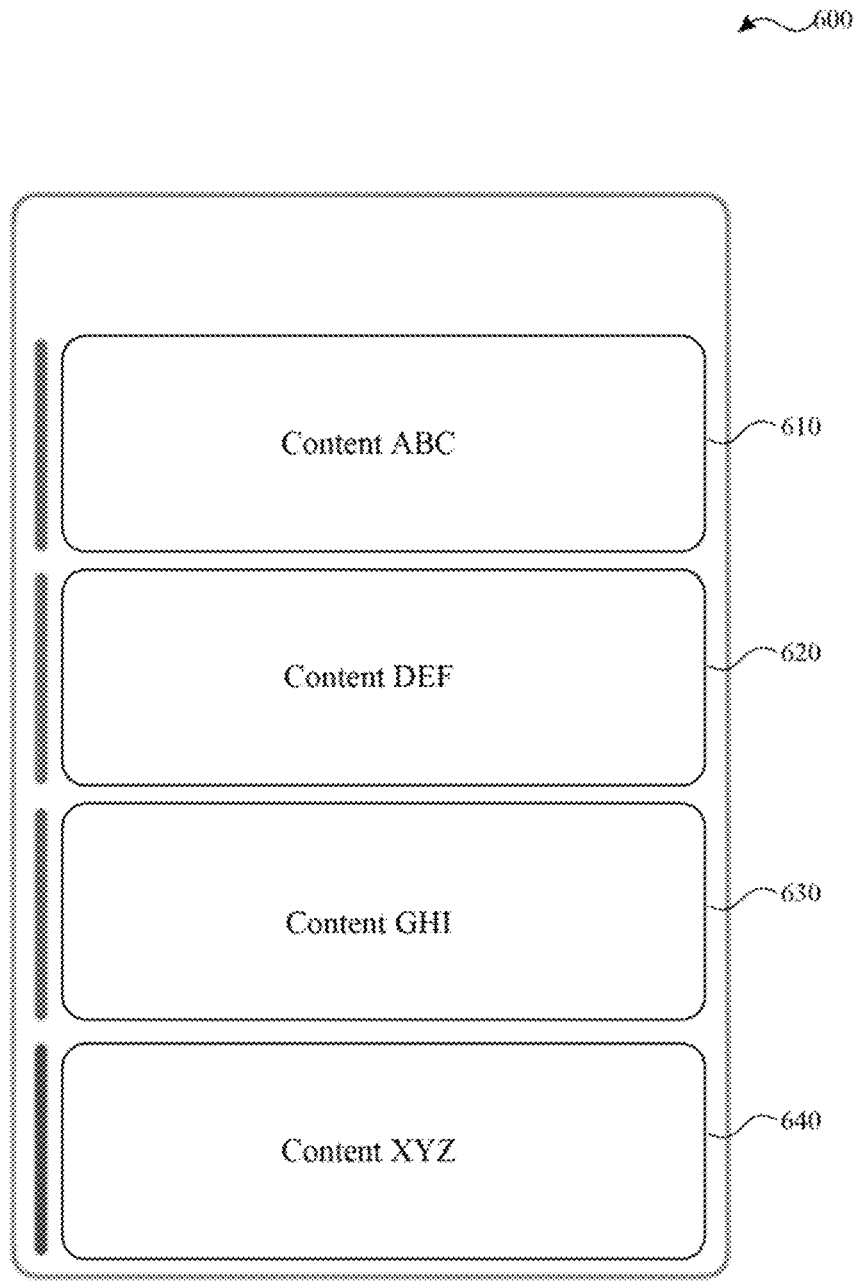
FIG. 6 illustrates an example graphical user interface displaying recommendations in the form of respective user interface elements in accordance with one or more implementations.

The electronic device 110, upon activation, utilizes the stored machine learning model to determine a set of cards to initially provide for display to a user (e.g., UI elements corresponding to particular watch tile faces as discussed in FIG. 6). Since the machine learning model has been trained based on scenarios that users may typically encounter, there is an increased likelihood that the set of cards initially provided for display to the user will be relevant to the user.

The relevance engine and recommendation provider 240 receives the configuration files 230. The configuration files 230 are utilized by the relevance engine and recommendation provider 240 to pre-train the machine learning model that is subsequently stored in the particular electronic device. In this regard, the machine learning model is pre-trained based at least in part on the information from the configuration files 230. Using the configuration files 230, the relevant engine and recommendation provider 240 can then determine the relevance scores, and to determine recommendations based on a ranking of the relevance scores, where the relevance scores may be provided to the machine learning model as part of the pre-training of the machine learning model. Alternatively or conjunctively, the relevance engine and recommendation provider 240 may provide information from the configuration files 230 (e.g., the simulated user activity) to the ML model in order to determine a relevance score(s) and then subsequently provide this relevance score(s) to the relevance engine and recommendation provider 240 for providing one or more recommendations. Such recommendations, as mentioned before, may be in the form of respective UI elements (e.g., wearable device face tiles as shown in FIG. 6) that are provided for display on the electronic device 110. In an example, such UI elements are provided as wearable device face tiles that may be presented in manner that the user may interact with the wearable device face tiles (e.g., as discussed further in FIG. 4) through touch input, gestures and/or scrolling, etc.

To determine a relevance score for a particular UI element that may be provided as a recommendation, the relevance engine and recommendation provider 240 may calculate a Gaussian curve for each particular feature where the Gaussian curve indicates an affinity value (e.g., mean of the Gaussian curve) and a confidence value (e.g., variance of the Gaussian curve) of the particular feature. In an implementation, a respective Gaussian curve for a particular feature is calculated using an affinity value and a variance value of a particular feature, which is based on an assumption that a given affinity value is normally distributed. Examples of features, related to different types of inputs, are discussed further below. The relevance score for the particular UI element may be determined based at least in part on a sum of different Gaussian curves for a number of different features and/or other values discussed further below.

The mean of the Gaussian curve discussed above corresponds to value indicating an affinity (e.g., relevance) of the feature to the user. The variance indicates a confidence value of the affinity of the feature to the user. In an example, a positive affinity of a feature may correspond to user behavior such as when the user taps or clicks on a UI element associated with a wearable device application. Additionally, a negative affinity of a feature may correspond to user behavior such as when the user scrolls by, without any additional interaction, the UI element associated with the wearable device application and/or does not tap or click on the UI element. Further, as an example, a high variance of a particular feature indicates that the affinity value (e.g., mean of the Gaussian curve) of the feature has a low confidence, and a low variance of a particular feature indicates that the affinity value of the feature has a high confidence.

Further, the relevance engine and recommendation provider 240 include a "bias" value for the particular UI element that may be utilized as part of determining the relevance score. In an example, an initial value for a bias value may be a value such as ten percent (e.g., 0.1), and can be adjusted over time based on how often the user interacts with the particular UI element. The bias value, as used herein, refers to a likelihood or indication that the user will click on or tap the particular UI element, and in at least one implementation, is a particular feature that is always included in determining the relevance score for the particular UI element. For determining a final value for the relevance score, the relevance engine and recommendation provider 240 determines a sum of the aforementioned Gaussian curves and the bias value. In one or more implementations, the relevance engine and recommendation provider 240 may utilize a ML model to determine the relevance score in the manner described above. For example, the ML model may implemented using a deep neural network, convolutional network, unsupervised learning technique (e.g., clustering), Bayesian network, hidden Markov model, collaborative filtering, and/or matrix decomposition, and the like. Based at least in part on the relevance scores, the relevance engine and recommendation provider 240 generates and/or trains the ML model (e.g., the user simulation based machine learning model 250), which is then stored on a particular electronic device (e.g., the electronic device 110), where the particular electronic device may then utilize the machine learning model for providing recommendations for display on the device itself.

Some non-limiting examples of the aforementioned features (e.g., that a relevance score may be calculated for) may include information that describes the user's current environment and/or that describes historical or likely user behavior such as a current location of user, current time of day or particular time period of the day (e.g., morning, afternoon evening), recent user activity (e.g., what was the user doing), personal digital assistant information, historical topic information requested or other information searched by user (e.g., stocks, weather, sports, categories of applications, etc.), locally stored user profile information, dwell time, scrolling activity (e.g., how far does the user scroll down a list of UI elements), tap through or not activity (e.g., does a user tap on the UI element), a likelihood that the user will launch an application (e.g., based on information such as prior user activity and a probability calculation), and/or when the user puts on or takes off the wearable device or device (e.g., to determine the beginning and end of a user's typical). The content of a particular UI element may be considered a feature that may be included in the relevance score. Other examples of features can include an application identifier for a particular application, and an identifier for a particular UI element provided by an application.

In at least an implementation, features may be included in different groups. For example, features may be included in either a "generalizing" group, which includes features that are not specific to a particular application(s), or a "memorizing" group that include features specific to a particular application. Further, a particular feature group may include different levels of features. Examples of features included in the generalizing group include features indicating a current location, a current time, and a time period of the day. Examples of features included in the memorizing group include features related to a dwell time, tap through for a particular application, scrolling past a particular application performed by the user, a likelihood that the user will launch an application, an application identifier for a particular application, and a specific time and/or location. Examples of levels of features for the generalizing group may include a first level including features related to time and/or location, and a second level for categories of applications (e.g., business, game, etc.). Examples of levels of features for the memorizing group may include a first level including features related to a specific time and/or specific location, and a second level for features related to particular graphical elements of the particular application.

In an example, when a new UI element (e.g., wearable device face tile) for a particular application is introduced, features included in the generalizing group may be weighted more than other features included in the memorizing group. Initially, for this new UI element, the generalizing features may have lower variances (e.g., indicating greater confidence) in comparison with higher variances (e.g., indicating lower confidence) for the memorizing features. Over time as the user increases interaction to provide additional information related to user activity with the new UI element, the features included in the memorizing group may be weighted more than features included in the generalizing group. Further, in an example, after the user performs an initial action for the new UI element, for each subsequent action on the new UI element, a given feature with a very high variance can be weighted more than another feature with a lower variance. In this manner, the system enables a feature with less confidence to have a greater chance to be explored, and enables another feature with greater confidence to have a greater chance to be exploited.

Figure 3:
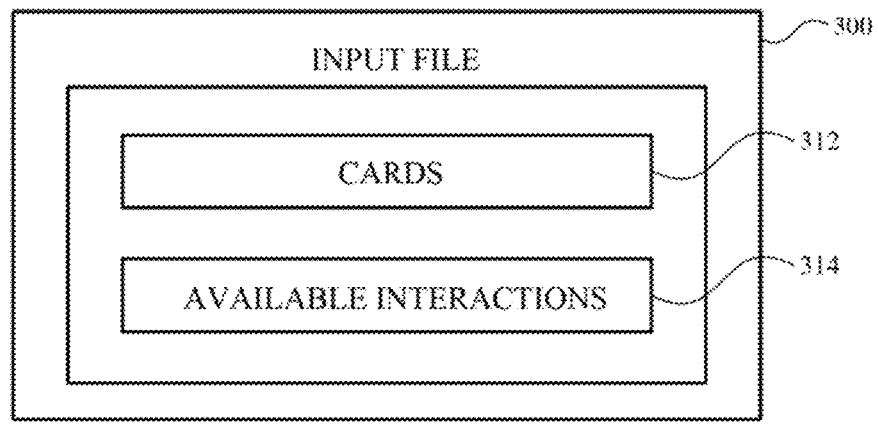
FIG. 3 illustrates an example input file in accordance with one or more implementations.

FIG. 3 illustrates an example input file 300 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In an example, the input file 300 may be utilized by components of the server 130, such as those illustrated in FIG. 2 as discussed above, in order to generate a set of configuration files for pre-training a model learning model that is then stored on a particular electronic device for providing recommendations. The input file 300 includes information for cards 312 and information of available interactions 314 for each of the cards 312. In an implementation, the information for cards 312 includes information indicating which cards to show on the display of an electronic device (e.g., the electronic device 110) in a given state. As mentioned before, in an implementation, each state may correspond to a particular scenario of a user corresponding to a particular time and/or location (e.g., morning, commute, work, school, gym, and home that relate to different routines or periods of time during the day or night). In an implementation, the information of available interactions 314 includes information indicating which interaction (s) are available for each card such as, without limitation, interactions may be gesture-based (e.g., tap, press, swipe, drag, etc.) that can invoke different functionality provided by a particular application.

Figure 4:
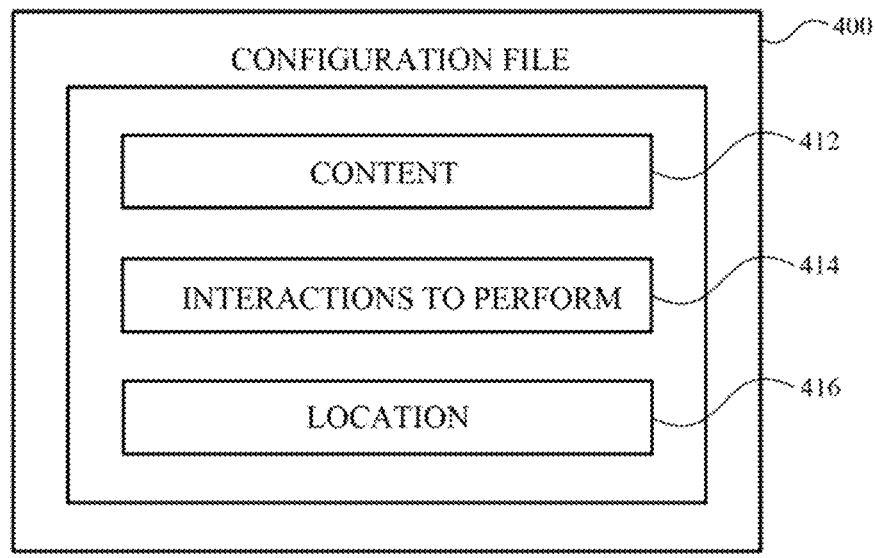
FIG. 4. illustrates an example configuration file in accordance with one or more implementations.

FIG. 4. illustrates an example configuration file 400 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In an example, the configuration file 400 is generated, based on the input file 300, by components of the server 130, such as those illustrated in FIG. 2. The configuration file 400 may be included in a set of configuration files for pre-training a model learning model (e.g., the user simulation based machine learning model 250) that is then stored on a particular electronic device for providing recommendations. The configuration file 400 pertains to a particular scenario and includes information for content 412 of a set of cards, information of actions to perform 414 for the set of cards, and information related to a location 416 of the user for that particular scenario represented by the configuration file 400. In an implementation, the information for content 412 includes information including a list of the data or content to show at a specific time or date for each card. In an implementation, the information of interactions to perform 414 includes information including a list of interactions to perform for each card. The configuration file 400 may also include information regarding the user's environment for the scenario, e.g. time of day, location, etc.

Figure 5:
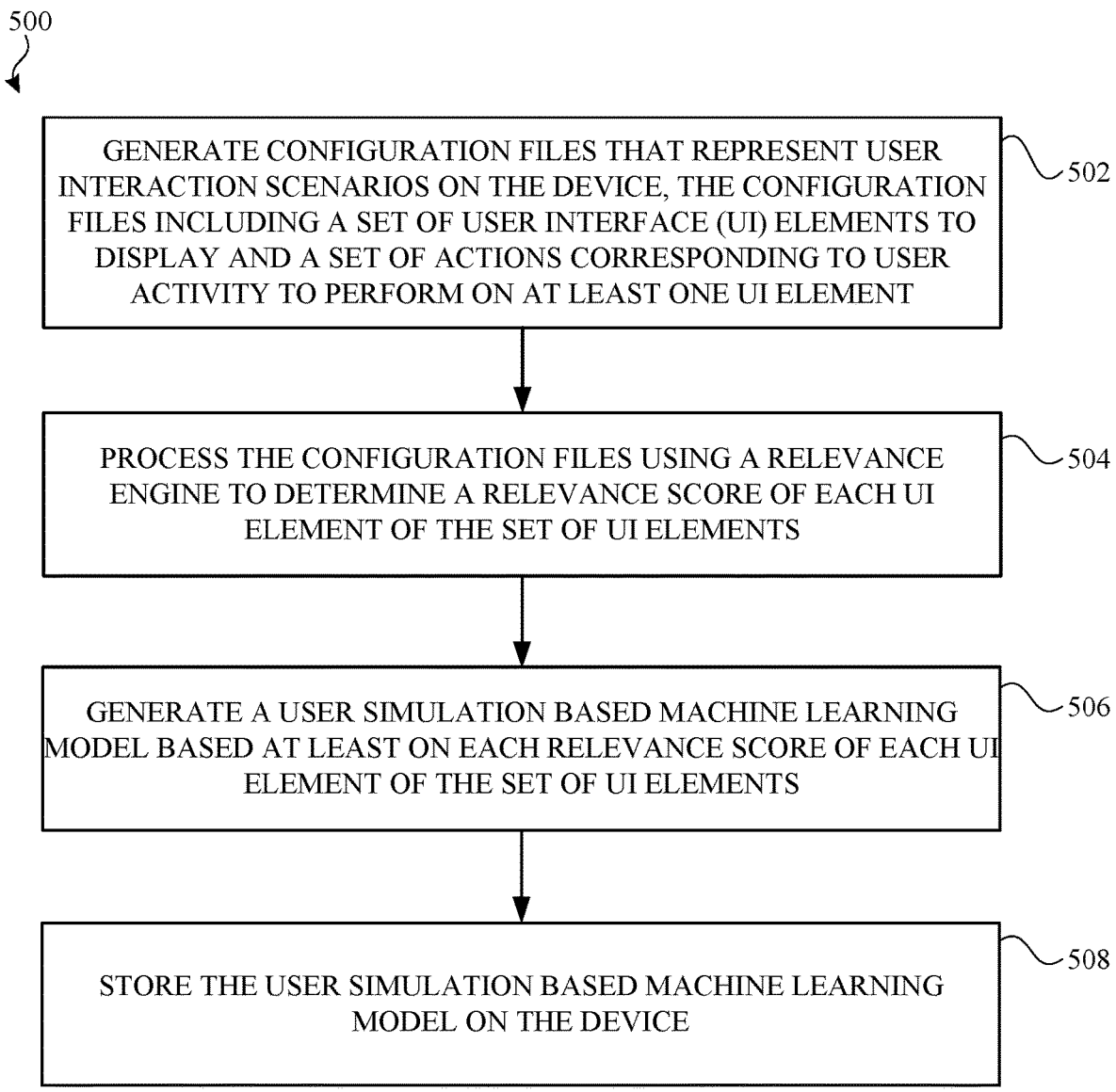
FIG. 5 illustrates a flow diagram of an example process for providing a user simulation for model initialization in accordance with one or more implementations.

FIG. 5 illustrates a flow diagram of an example process 500 for generating a user simulation based machine learning model with one or more implementations. For explanatory purposes, the process 500 is primarily described herein with reference to the server 130 of FIG. 1. However, the process 500 is not limited to the server 130 of FIG. 1, and one or more blocks (or operations) of the process 500 may be performed by other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, the server 130 generates configuration files that represent user interaction scenarios on the device, the configuration files including a set of user interface (UI) elements to display and a set of interactions corresponding to user activity to perform on at least one UI element of the set of UI elements, where the user activity comprises simulated activity performed by a user over a period of time (502).

User activity may include interactions that are performed on applications local to the server 130. Some non-limiting examples of applications local to the server 130 may include wearable device applications, widgets, or programs, etc., such as the following: calendar, reminders, alarms, timers, stopwatch, weather, stocks, sports, TV shows, maps, turn-by-turn navigation, sunrise, sunset, activity, breathe, fitness, heartbeat information, active workout, commute, news, Internet of things (IoT), home automation, digital wallet, and/or other wearable device applications, etc.

The server 130 processes the configuration files using a relevance engine to determine a relevance score of each UI element of the set of UI elements in which the relevance score is based at least in part on weights assigned to features based on the simulated user activity and respective variance values of the features, and the features include information related to a location or time (504).

In one or more implementations, a Gaussian curve for each particular feature may be determined where the Gaussian curve indicates an affinity value (e.g., mean of the Gaussian curve) and a confidence value (e.g., variance of the Gaussian curve) of the particular feature. The relevance score for the particular UI element may be determined based at least in part on a sum of different Gaussian curves for a number of different features and/or other values. Examples of signals related to features that could affect the relevance score include an order that the user launches one or more apps on the device and an importance of a UI element based on other factors (e.g., important person in a calendar invite). In a touch interface implementation, the relevance score may be further based on a history of not tapping or interacting with a UI element, such that UI element can be scored lower.

The server 130 generates a user simulation based machine learning model based at least on each relevance score of each UI element of the set of U elements (506). The server 130 stores the user simulation based machine learning model on a particular device (508). The particular device in an example is separate device from the server 130, such as the electronic device 110 described above in FIG. 1.

FIG. 6 illustrates an example graphical user interface displaying recommendations in the form of respective user interface elements in accordance with one or more implementations. A relevance engine and recommendation provider of the electronic device 110 may provide for display a user interface 600 for presenting UI elements 610, 620, 630, and 640, which may include respective content therein for display. In this example, the relevance engine and recommendation provider of the electronic device may provide similar functionality for determining relevance scores as discussed above for the relevance engine and recommendation provider 240 of the server 130. In one or more implementations, the UI elements 610, 620, 630, 640 may each be a respective wearable device face tile displayed by the electronic device 110 based on the stored user simulation based machine learning model. Each UI element may have a different relevance score, and the relevance scores are ranked by the relevance engine and recommendation provider. In this example, the UL elements 610, 620, 630, and 640 are sorted from highest relevance score to lowest relevance score. However, it is appreciated that the UI elements 610, 620, 630, and 640 may be sorted in a different order(s) than the example shown in FIG. 6. Further, relevance engine and recommendation provider may concurrently display any number of the ranked UI elements (or subset thereof) even though, for purposes of explanation, four UI elements are shown in FIG. 6.

Figure 7:
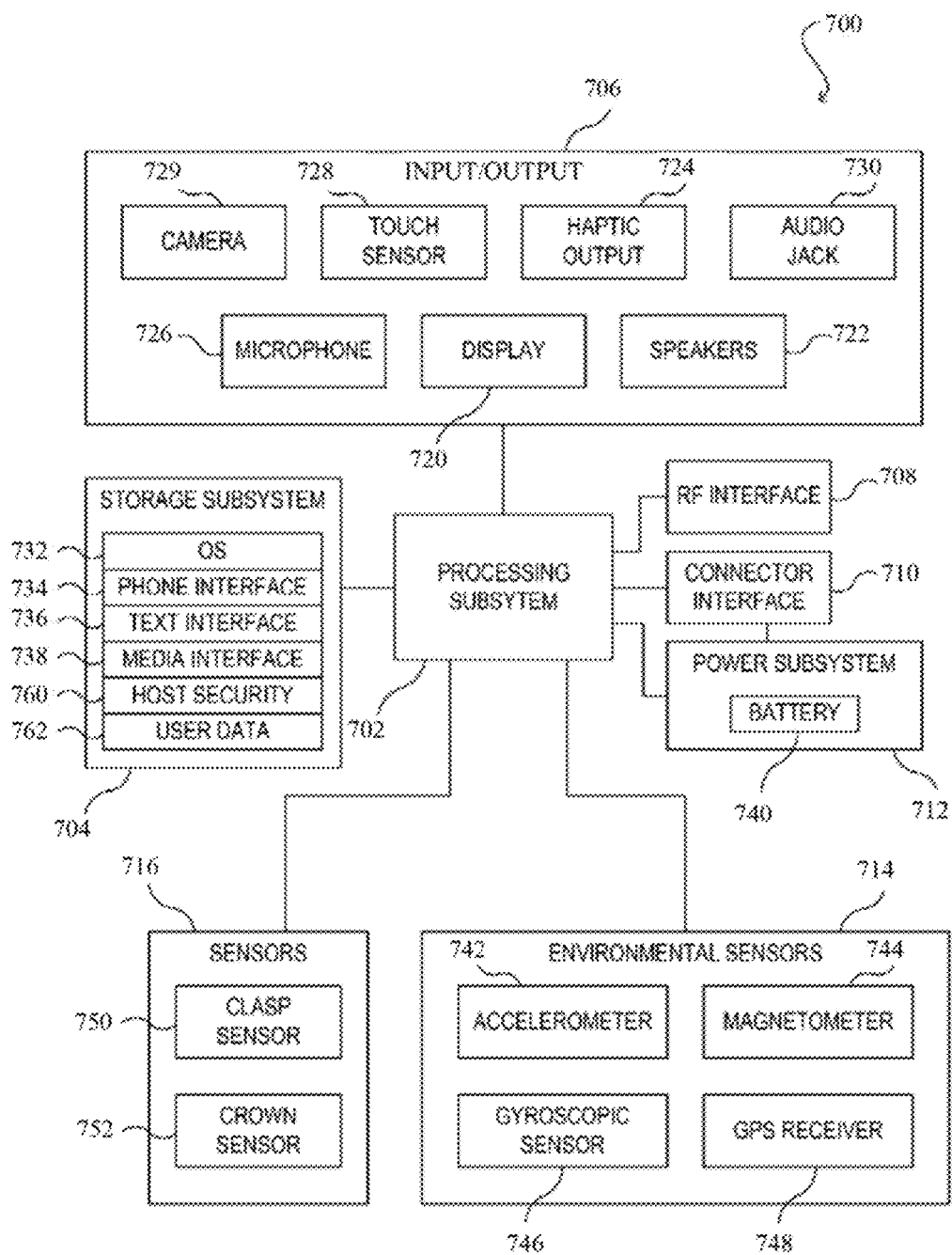
FIG. 7 is an example block diagram of a device (e.g., a wearable device) with which one or more implementations of the subject technology may be implemented.

FIG. 7 is an example block diagram of a wearable device 700 (e.g., a smart watch) according to one or more implementations of the subject technology. The wearable device 700 can be, and/or can be a part of, the electronic device 110 shown in FIG. 1. Wearable device 700 can include processing subsystem 702, storage subsystem 704, input/output 706, RF interface 708, connector interface 710, power subsystem 712, environmental sensors 714, and strap sensors 716. Wearable device 700 can also include other components (not explicitly shown).

In many implementations, the wearable device 700 may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 704 can be implemented, e.g., using magnetic storage media, flash memory, other semiconductor memory (e.g., DRAM, SRAM), or any other non-transitory storage medium, or a combination of media, and can include volatile and/or non-volatile media. In some implementations, storage subsystem 704 can store media items such as audio files, video files, image or artwork files; information about a user's contacts (names, addresses, phone numbers, etc.); information about a user's scheduled appointments and events; notes; and/or other types of information, examples of which are described below. In some implementations, storage subsystem 704 can also store one or more application programs to be executed by processing subsystem 702 (e.g., video game programs, personal information management programs, media playback programs, interface programs associated with particular host devices and/or host device functionalities, etc.).

Input/output 706 can include any combination of input and output devices. A user can operate input devices of input/output 706 to invoke the functionality of wearable device 700 and can view, hear, and/or otherwise experience output from wearable device 700 via output devices of input/output 706.

Examples of output devices include display 720, speakers 722, and haptic output generator 724. Display 720 can be implemented using compact display technologies, e.g., LCD (liquid crystal display), LED (light-emitting diode), OLED (organic light-emitting diode), or the like. In some implementations, display 720 can incorporate a flexible display element or curved-glass display element, allowing wearable device 700 to conform to a desired shape. One or more speakers 722 can be provided using small-form-factor speaker technologies, including any technology capable of converting electronic signals into audible sound waves. In some implementations, speakers 722 can be used to produce tones (e.g., beeping or ringing) and can but need not be capable of reproducing sounds such as speech or music with any particular degree of fidelity. Haptic output generator 724 can be, e.g., a device that converts electronic signals into vibrations; in some implementations, the vibrations can be strong enough to be felt by a user wearing wearable device 700 but not so strong as to produce distinct sounds.

Examples of input devices include microphone 726, touch sensor 728, and camera 729. Microphone 726 can include any device that converts sound waves into electronic signals. In some implementations, microphone 726 can be sufficiently sensitive to provide a representation of specific words spoken by a user, in other implementations, microphone 726 can be usable to provide indications of general ambient sound levels without necessarily providing a high-quality electronic representation of specific sounds.

Touch sensor 728 can include, e.g., a capacitive sensor array with the ability to localize contacts to a particular point or region on the surface of the sensor and in some instances, the ability to distinguish multiple simultaneous contacts. In some implementations, touch sensor 728 can be overlaid over display 720 to provide a touchscreen interface, and processing subsystem 702 can translate touch events (including taps and/or other gestures made with one or more contacts) into specific user inputs depending on what is currently displayed on display 720. In some implementations, touch sensor 728 can also determine a location of a touch on the cover glass. A touch sensor may be incorporated into or on the display stack in order to determine a location of a touch. The touch sensor may be self-capacitive in certain implementations, mutual-capacitive in others, or a combination thereof.

Camera 729 can include, e.g., a compact digital camera that includes an image sensor such as a CMOS sensor and optical components (e.g., lenses) arranged to focus an image onto the image sensor, along with control logic operable to use the imaging components to capture and store still and/or video images. Images can be stored, e.g., in storage subsystem 704 and/or transmitted by wearable device 700 to other devices for storage. Depending on implementation, the optical components can provide fixed focal distance or variable focal distance; in the latter case, autofocus can be provided. Zero, one, or more cameras can be provided, depending on implementation.

In some implementations, input/output 706 can provide output to and/or receive input from an auxiliary device such as a headset. For example, audio jack 730 can connect via an audio cable (e.g., a standard 2.7-mm or 3.7-mm audio cable) to an auxiliary device. Audio jack 730 can include input and/or output paths. Accordingly, audio jack 730 can provide audio to the auxiliary device and/or receive audio from the auxiliary device. In some implementations, a wireless connection interface can be used to communicate with an auxiliary device.

Processing subsystem 702 can be implemented as any electronic device capable of processing, receiving, or transmitting data or instructions. Processing subsystem 702 can include one or more integrated circuits. For example, processing subsystem 702 may include one or more of: one or more single-core or multi-core microprocessors or microcontrollers, a central processing unit (CPU), an application-specific integrated circuit (ASIC), a digital signal processor (DSP), or additional combinations of such devices. In operation, processing subsystem 702 can control the operation of wearable device 700. In various implementations, processing subsystem 702 can execute a variety of programs in response to program code and can maintain multiple concurrently executing programs or processes. At any given time, some or all of the program code to be executed can be resident in processing subsystem 702 and/or in storage media such as storage subsystem 704.

Through suitable programming, processing subsystem 702 can provide various functionality for wearable device 700. For example, in some implementations, processing subsystem 702 can execute an operating system (OS) 732 and various applications for interfacing with a host device, such as a phone-interface application 734, a text-interface application 736, and/or a media interface application 738.

In some implementations, processing subsystem 702 can also execute a host security process 760 that provides support for establishing and maintaining a verified communication session with a host device. User data 762 can include any information specific to a user, such as identification information, user-specified settings and preferences, customized information (e.g., contacts, predefined text messages), and any other user-related data or content.

RF (radio frequency) interface 708 can allow wearable device 700 to communicate wirelessly with various host devices. RF interface 708 can include RF transceiver components such as an antenna and supporting circuitry to enable data communication over a wireless medium, e.g., using Wi-Fi (IEEE 702.7 family standards), Bluetooth™ (a family of standards promulgated by Bluetooth SIG, Inc.), or other protocols for wireless data communication. RF interface 708 can be implemented using a combination of hardware (e.g., driver circuits, antennas, modulators/demodulators, encoders/decoders, and other analog and/or digital signal processing circuits) and software components. In some implementations, RF interface 708 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 708.

Connector interface 710 can allow wearable device 700 to communicate with various host devices via a wired communication path, e.g., using Universal Serial Bus (USB), universal asynchronous receiver/transmitter (UART), or other protocols for wired data communication. In some implementations, connector interface 710 can provide a power port, allowing wearable device 700 to receive power, e.g., to charge an internal battery. For example, connector interface 710 can include a connector such as a mini-USB connector or a custom connector, as well as supporting circuitry.

Environmental sensors 714 can include various electronic, mechanical, electromechanical, optical, or other devices that provide information related to external conditions around wearable device 700. Sensors 714 in some implementations can provide digital signals to processing subsystem 702, e.g., on a streaming basis or in response to polling by processing subsystem 702 as desired. Any type and combination of environmental sensors can be used; shown by way of example are accelerometer 742, a magnetometer 744, a gyroscope sensor 746, and a GPS receiver 748.

Sensors 716 can include various electronic, mechanical, electromechanical, optical, or other devices that provide information to wearable device 700, such as clasp sensor 750 that can detect when clasp members are engaged with each other or disengaged from each other. As another example, one or more crown sensors 752 can be disposed to detect input from a crown. Crown sensors 752 can also include motion sensors, accelerometers, pressure sensors (e.g., piezoelectric devices), or the like.

Power subsystem 712 can provide power and power management capabilities for wearable device 700. For example, power subsystem 712 can include a battery 740 (e.g., a rechargeable battery) and associated circuitry to distribute power from battery 740 to other components of wearable device 700 that require electrical power. In some implementations, power subsystem 712 can also include circuitry operable to charge battery 740, e.g., when connector interface 710 is connected to a power source. In some implementations, power subsystem 712 can include a "wireless" charger, such as an inductive charger, to charge battery 740 without relying on connector interface 710. An inductive charging base may transmit power to an inductive receiver within the device in order to charge a battery of the device.

It will be appreciated that wearable device 700 is illustrative and that variations and modifications are possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Figure 8:
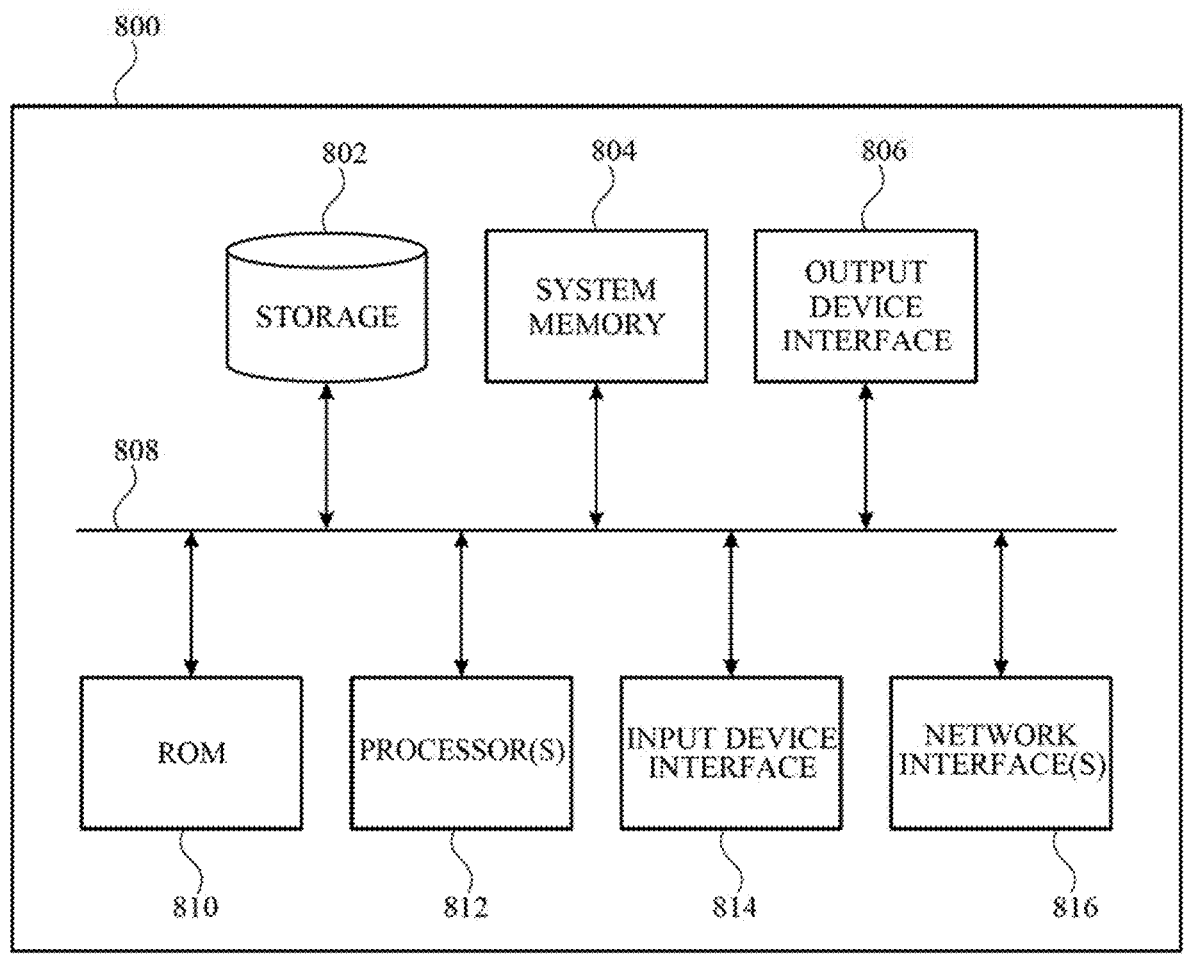
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of the server 130 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 130 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    a memory; and
    at least one processor configured to:
        generate configuration files that represent user interaction scenarios on a second device, the configuration files including a set of user interface (UI) elements to display and a set of simulated user interactions to perform on at least one UI element of the set of UI elements;
        determine a relevance score of each UI element of the set of UI elements by processing the configuration files using a relevance engine, wherein the relevance score is determined based at least in part on weights assigned to features based on the simulated user activity and respective variance values of the features, and the features include information related to a location or time;
        generate a user simulation based machine learning model based at least on each relevance score of each UI element of the set of UI elements; and
        store the user simulation based machine learning model on the second device for execution by the second device.

2. The device of claim 1, wherein the configuration files include information related to an environment of a user corresponding to a time of day or a location.

3. The device of claim 1, wherein the relevance score is based at least in part on a respective bias value for each UI element.

4. The device of claim 1, wherein the relevance score is based at least in part on a sum of respective Gaussian curves, each of the respective Gaussian curves being generated using an affinity value and a variance value of a particular feature, and based on a normal distribution of the affinity value.

5. The device of claim 1, wherein a high variance value of a first feature indicates a low confidence associated with the first feature, and a low variance value of a second feature indicates a high confidence associated with the second feature, wherein the first feature is assigned a greater weight than the second feature for providing the relevance score.

6. The device of claim 1, further comprising:
increasing the variance values of the features to indicate a lower confidence associated with the features.

7. The device of claim 1, wherein the set of UI elements correspond to one or more applications executing on the device.

8. The device of claim 1, wherein the user interaction scenarios include at least one of a morning, commute, work, school, gym, or home.

9. The device of claim 1, wherein the device comprises a server.

10. The device of claim 1, wherein the second device comprises a wearable electronic device and the wearable electronic device, after being activated, provides for display a particular UI element in accordance with the stored user simulation based machine learning model, and wherein the particular UI element corresponds to a watch face graphical element.

11. A method comprising:
generating, at a first device, configuration files that represent user interaction scenarios on a second device, the configuration files including a set of user interface (UI) elements to display and a set of simulated user interactions to perform on at least one UI element of the set of UI elements;
determining a relevance score of each UI element of the set of UI elements by processing the configuration files using a relevance engine, wherein the relevance score is determined based at least in part on weights assigned to features based on the simulated user interactions and respective variance values of the features, and the features include information related to a location or time;
generating a user simulation based machine learning model based at least on each relevance score of each UI element of the set of UI elements; and
storing the user simulation based machine learning model on the second device for execution by the second device.

12. The method of claim 11, wherein the configuration files include information related to an environment of a user corresponding to a time of day or a location.

13. The method of claim 11, wherein the relevance score is based at least in part on a bias value for the UI element.

14. The method of claim 11, wherein the relevance score is based at least in part on a sum of respective Gaussian curves, each of the respective Gaussian curves being generated using an affinity value and a variance value of a particular feature, and based on a normal distribution of the affinity value.

15. The method of claim 11, wherein a high variance value of a first feature indicates a low confidence associated with the first feature, and a low variance value of a second feature indicates a high confidence associated with the second feature, wherein the first feature is assigned a greater weight than the second feature for providing the relevance score.

16. The method of claim 11, further comprising:
increasing the variance values of the features to indicate a lower confidence associated with the features.

17. The method of claim 11, wherein the set of UI elements correspond to one or more applications that are local to the second device.

18. The method of claim 11, wherein the user interaction scenarios include at least one of a morning, commute, work, school, gym, or home.

19. The method of claim 11, wherein the second device comprises a wearable electronic device and the wearable electronic device, after being activated, provides for display a particular UI element in accordance with the stored user simulation based machine learning model, and wherein the particular UI element corresponds to a watch face graphical element.

20. A computer program product comprising code stored in a non-transitory computer-readable storage medium, the code, when executed by one or more processors, causes the one or more processors to perform operations comprising:
generating, at a first device, configuration files that represent user interaction scenarios on a second device, the configuration files including a set of user interface (UI) elements to display and a set of simulated user interactions to perform on at least one UI element of the set of UI elements;
determining a relevance score of each UI element of the set of UI elements by processing the configuration files using a relevance engine, wherein the relevance score is determined based at least in part on weights assigned to features based on the simulated user interactions and respective variance values of the features, and the features include information related to a location or time;
generating a user simulation based machine learning model based at least on each relevance score of each UI element of the set of UI elements; and
storing the user simulation based machine learning model on the second device for execution by the second device.

* * * * *